United States Patent
Chang et al.

(10) Patent No.: US 11,633,695 B1
(45) Date of Patent: Apr. 25, 2023

(54) DEVICE AND METHOD OF SIMULTANEOUSLY REMOVING FLAMMABLE GASES AND NITROUS OXIDE

(71) Applicant: Industrial Technology Research Institute, Hsinchu (TW)

(72) Inventors: Chuan-Lin Chang, Taichung (TW); Hong-Ping Lin, Taipei (TW); Shou-Nan Li, Nantou County (TW); Jui-Hsiang Cheng, Hsinchu (TW); Hui-Ya Shih, Changhua County (TW); I-Ling Nien, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/564,228

(22) Filed: Dec. 29, 2021

(30) Foreign Application Priority Data

Nov. 22, 2021 (TW) .................. 110143344

(51) Int. Cl.
| | | |
|---|---|---|
| *B01D 46/00* | (2022.01) | |
| *B01D 46/24* | (2006.01) | |
| *B01D 53/46* | (2006.01) | |
| *B01D 53/75* | (2006.01) | |
| *B01D 53/76* | (2006.01) | |
| *B01D 53/86* | (2006.01) | |
| *B01J 23/745* | (2006.01) | |
| *B01J 35/02* | (2006.01) | |

(52) U.S. Cl.
CPC ......... *B01D 53/75* (2013.01); *B01D 46/0027* (2013.01); *B01D 53/46* (2013.01); *B01D 53/76* (2013.01); *B01D 53/8628* (2013.01); *B01D 53/8631* (2013.01); *B01J 23/745* (2013.01); *B01J 35/023* (2013.01); *B01D 46/2407* (2013.01); *B01D 2255/2092* (2013.01); *B01D 2255/20707* (2013.01); *B01D 2255/20738* (2013.01); *B01D 2255/9202* (2013.01); *B01D 2255/9205* (2013.01); *B01D 2273/20* (2013.01)

(58) Field of Classification Search
CPC ....... B01J 23/745; B01J 35/023; B01D 53/75; B01D 53/76; B01D 53/8628; B01D 53/46; B01D 46/0027; B01D 53/8631; B01D 46/2407; B01D 2273/20; B01D 2255/20738; B01D 2255/2092; B01D 2255/20707; B01D 2255/9205; B01D 2255/9202; B01D 2257/402; B01D 2258/0216
See application file for complete search history.

(56) References Cited

U.S. PATENT DOCUMENTS

| | | | |
|---|---|---|---|
| 2007/0086931 A1 | 4/2007 | Raoux et al. | |
| 2014/0112853 A1* | 4/2014 | Mohanan | B01J 29/85 502/66 |
| 2014/0308186 A1* | 10/2014 | Messineo | B01D 53/70 423/210 |
| 2015/0113966 A1* | 4/2015 | Kamasamudram | B01D 53/9409 423/213.2 |

FOREIGN PATENT DOCUMENTS

| | | | | |
|---|---|---|---|---|
| CN | 101450322 | | 5/2011 | |
| CN | 202606002 | | 12/2012 | |
| CN | 104437499 | | 3/2015 | |
| CN | 103157466 | | 4/2015 | |
| CN | 107670669 | | 2/2018 | |
| KR | 2019 0 071 265 | * | 6/2019 | ............. Y02P 70/10 |
| TW | 553761 | | 9/2003 | |
| TW | 201002413 | | 1/2010 | |
| TW | I683697 | | 2/2020 | |
| TW | 202010566 | | 3/2020 | |
| TW | M614915 | | 7/2021 | |
| WO | WO 2013/072658 A1 | * | 5/2013 | ............. B01D 53/32 |
| WO | WO 2022/005985 A1 | * | 1/2022 | ............. F01N 3/023 |

OTHER PUBLICATIONS

"Office Action of Taiwan Counterpart Application", dated Jun. 2, 2022, p. 1-p. 10.
Arunangshu Mukhopadhyay et al., "Effect of high temperature on the performance of filter fabric," Journal of Industrial Textiles, vol. 45, Issue 6, May 2016, pp. 1-16.

(Continued)

*Primary Examiner* — Timothy C Vanoy

(74) *Attorney, Agent, or Firm* — JCIPRNET

(57) ABSTRACT

A device and method of simultaneously removing flammable gases and nitrous oxide are provided. The device includes a thermal oxidation chamber, a high-temperature resistant dust filter, and a catalyst chamber. The thermal oxidation chamber is configured to receive an exhaust gas from a process tool. The exhaust gas includes flammable gases and nitrous oxide. The thermal oxidation chamber has a first exhaust pipe to emit nitrous oxide and dust generated after the exhaust gas is thermally oxidized. The high-temperature resistant dust filter receives dust and nitrous oxide from the first exhaust pipe, wherein the high-temperature resistant dust filter has a filter fiber net and a second exhaust pipe, and the second exhaust pipe is configured to emit nitrous oxide. The catalyst chamber receives nitrous oxide from the second exhaust pipe, wherein the catalyst chamber has a nitrous oxide decomposition catalyst to decompose nitrous oxide into nitrogen and oxygen.

17 Claims, 4 Drawing Sheets

(56) References Cited

OTHER PUBLICATIONS

Michalis Konsolakis, "Recent Advances on Nitrous Oxide (N2O) Decomposition over Non-Noble-Metal Oxide Catalysts: Catalytic Performance, Mechanistic Considerations, and Surface Chemistry Aspects," ACS Catalysis, vol. 5, No. 11, Sep. 2015, pp. 6397-6421.

Yanchen You et al., "Enhancement of N2O decomposition performance by N2O pretreatment over Ce—Co—O catalyst," Chemical Engineering Journal, vol. 347, Sep. 2018, pp. 184-192.

Qun Shen et al., "A study on N2O catalytic decomposition over Co/MgO catalysts," Journal of Hazardous Materials, vol. 163, Apr. 2009, pp. 1332-1337.

Ming-Xin Xu et al., "Direct catalytic decomposition of N2O over bismuth modified NiO catalysts," Journal of Hazardous Materials, vol. 401, Article 123334, Jan. 2021, pp. 1-8.

Yongzhao Wang et al., "Co/Hydroxyapatite catalysts for N2O catalytic decomposition: Design of well-defined active sites with geometrical and spacing effects," Molecular Catalysis, vol. 501, Article 111370, Feb. 2021, pp. 1-10.

\* cited by examiner

DEVICE AND METHOD OF SIMULTANEOUSLY REMOVING FLAMMABLE GASES AND NITROUS OXIDE

CROSS-REFERENCE TO RELATED APPLICATION

This application claims the priority benefit of Taiwan application serial no. 110143344, filed on Nov. 22, 2021. The entirety of the above-mentioned patent application is hereby incorporated by reference herein and made a part of this specification.

TECHNICAL FIELD

The disclosure relates to a device and a method of simultaneously removing flammable gases and nitrous oxide.

BACKGROUND

In 2016, the total global greenhouse gas emissions have reached 50 billion metric tons of carbon equivalent ($CO_2e$). According to the greenhouse gas emissions statistics of the U.S. Environmental Protection Agency Announcement in 2018, nitrous oxide ($N_2O$) is the third largest greenhouse gas. In particular, the most greenhouse gas emitted by the semiconductor industry in recent years is $N_2O$.

At present, thermal-wet type or burn-wet type is mostly used to treat exhaust gas made of mostly $N_2O$. However, when $N_2O$ undergoes pyrolysis, the emission issue of large amounts of the air pollutant NOx occurs. Moreover, in addition to $N_2O$ gas used in the semiconductor manufacturing process, flammable gases of silicon, phosphorus, arsenic, boron, etc. are also used together. When these flammable gases are oxidized at high temperature, inorganic dust is formed, thus causing pollution of other fine suspended particles (PM2.5).

SUMMARY

A device for simultaneously removing flammable gases and nitrous oxide of the disclosure includes a thermal oxidation chamber, a high-temperature resistant dust filter, and a catalyst chamber. The thermal oxidation chamber is configured to receive an exhaust gas from a process tool. The exhaust gas includes the flammable gases and nitrous oxide, wherein the thermal oxidation chamber has a first exhaust pipe to emit nitrous oxide and dust generated after the flammable gases are thermally oxidized. The high-temperature resistant dust filter receives the dust and nitrous oxide from the first exhaust pipe, wherein the high-temperature resistant dust filter has a filter fiber net and a second exhaust pipe, and the second exhaust pipe is configured to emit nitrous oxide. The catalyst chamber receives nitrous oxide from the second exhaust pipe, wherein the catalyst chamber has a nitrous oxide decomposition catalyst to decompose nitrous oxide into nitrogen ($N_2$) and oxygen ($O_2$).

A method of simultaneously removing flammable gases and nitrous oxide of the disclosure is to first heat exhaust gases from a process tool using the thermal oxidation chamber above, wherein the exhaust gas includes the flammable gases and nitrous oxide, and the flammable gases is thermally oxidized into dust. Then, the dust from the thermal oxidation chamber is filtered by the high-temperature resistant dust filter, and nitrous oxide emitted from the high-temperature resistant dust filter is decomposed into nitrogen and oxygen by the catalyst chamber.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The accompanying drawings in the following embodiments are intended to more completely describe the embodiments of the disclosure, but the disclosure may still be implemented in many different forms and is not limited to the described embodiments. In addition, for the sake of clarity, the relative distance, size, and location of each device or pipeline may be reduced or enlarged.

The disclosure provides a device for simultaneously removing flammable gases and nitrous oxide that may treat gas having a higher $N_2O$ concentration and simultaneously treat flammable gases.

The disclosure also provides a method of simultaneously removing flammable gases and nitrous oxide that may decompose $N_2O$ into $N_2$ and $O_2$ to achieve zero pollution emission, and prevent dust generated after high-temperature oxidation of flammable gases from being emitted to the outside.

Figure 1:
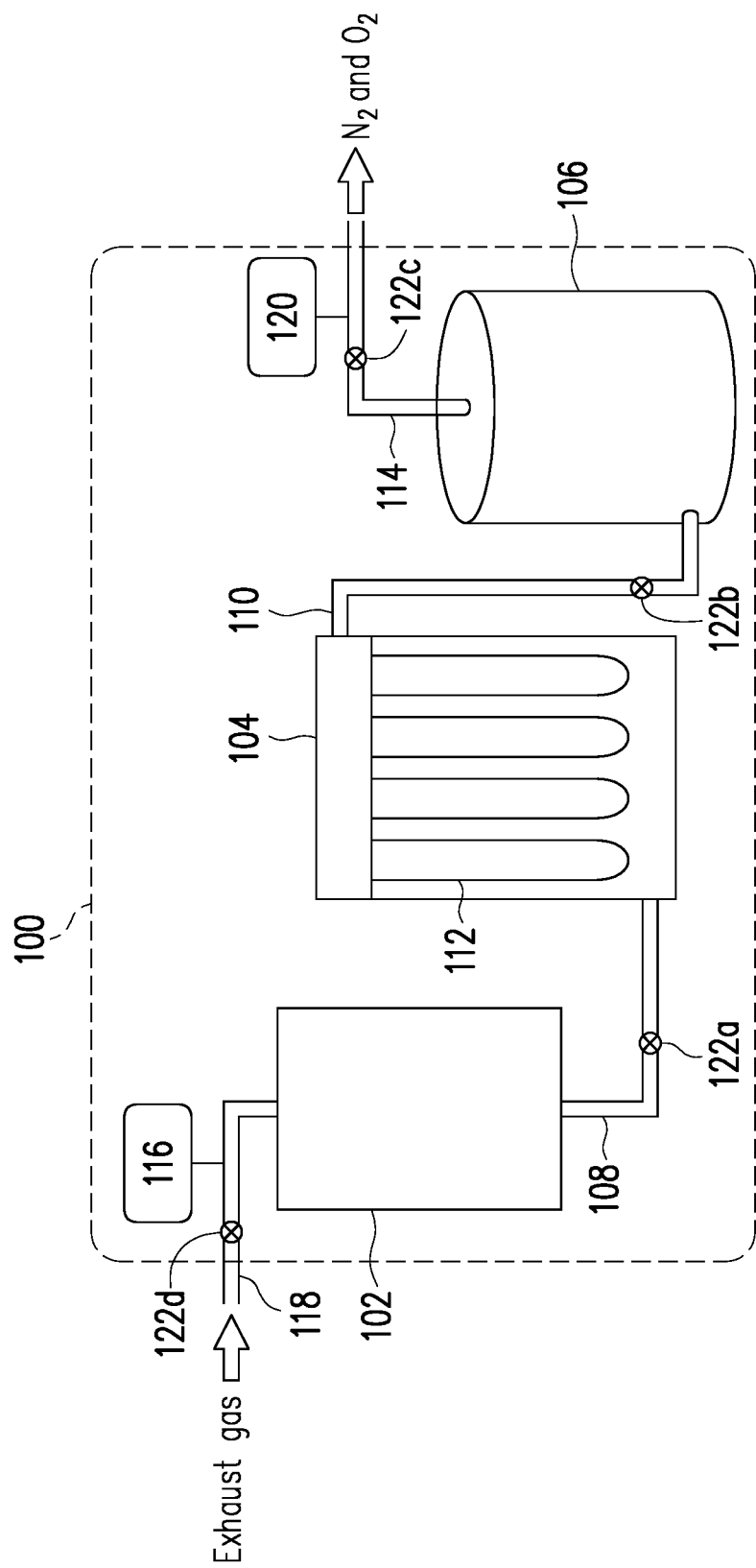
FIG. 1 is a schematic diagram of a device for simultaneously removing flammable gases and nitrous oxide according to an embodiment of the disclosure.

FIG. 1 is a schematic diagram of a device for simultaneously removing flammable gases and nitrous oxide according to an embodiment of the disclosure.

Please refer to FIG. 1, a device 100 of the present embodiment substantially includes a thermal oxidation chamber 102, a high-temperature resistant dust filter 104, and a catalyst chamber 106. The thermal oxidation chamber 102 is configured to receive exhaust gas from a process tool (not shown), wherein the exhaust gas may include flammable gases and nitrous oxide ($N_2O$). The thermal oxidation chamber 102 has a first exhaust pipe 108 to emit dust generated after $N_2O$ and exhaust gas are thermally oxidized.

The high-temperature resistant dust filter 104 receives dust and $N_2O$ from the first exhaust pipe 108, wherein a high-temperature resistant filter fiber net 112 is provided, and the operating temperature range of the high-temperature resistant dust filter 104 is from normal temperature to high temperature, such as between 20° C. and 750° C. The high-temperature resistant dust filter 104 also has a second exhaust pipe 110 to emit $N_2O$. As shown in FIG. 1, the position where the first exhaust pipe 108 is connected to the high-temperature resistant dust filter 104 is generally lower than the exit position of the second exhaust pipe 110. As a result, after dust and $N_2O$ of the first exhaust pipe 108 enter the high-temperature resistant dust filter 104, the dust is blocked by the filter fiber net 112 and falls to the bottom of the high-temperature resistant dust filter 104, and the $N_2O$ is emitted from the second exhaust pipe 110 above via the filter fiber net 112. In an embodiment, the material of the filter fiber net 112 is a high-temperature resistant material, and is not particularly limited, and may be, for example, ceramic ($Al_2O_3$) fiber, polytetrafluoroethylene (PTFE) fiber, polyimide (PI) fiber, aromatic polyamide (aramid) fiber, polyphenylene sulfide (PPS) fiber. The filter fiber net 112 has a high porosity. For example, when the filter fiber net has a density of about 0.4 g/cm$^3$ and the diameter of the ceramic fiber is about 2 μm to 3 μm, dust having a particle size of 100 nm to 1000 nm may be filtered out.

The catalyst chamber 106 receives $N_2O$ from the second exhaust pipe 110, and the catalyst chamber 106 has a nitrous oxide decomposition catalyst (not shown) that may decompose $N_2O$ into nitrogen ($N_2$) and oxygen ($O_2$). In an embodiment, the catalyst chamber 106 is filled with the nitrous oxide decomposition catalyst, the particle size of the catalyst may be between 2 mm to 5 mm, and the porosity in the catalyst chamber 106 is, for example, 60% to 70%. The "porosity" is defined as the weight of water after filling with catalyst/weight of water without catalyst x 100%, in a fixed volume. If the particle size of catalyst or the porosity of the catalyst chamber is too small, gas may not readily pass through, thus affecting treatment efficiency. Regarding the catalyst composition, in an embodiment, the nitrous oxide decomposition catalyst may be a composite catalyst of iron oxide and aluminum oxide, and the matching catalyst carrier may be titanium dioxide, generally referred to as an iron-aluminum-titanium catalyst, wherein the molar ratio range of sum of iron oxide and aluminum oxide to titanium dioxide is from 3.5:1 to 2.5:1, and the molar ratio range of iron oxide to aluminum oxide may be, for example, from 2.5:1 to 1.5:1. However, the disclosure is not limited thereto. The nitrous oxide decomposition catalyst may also include a metal element such as platinum (Pt), palladium (Pd), rhodium (Rh), copper (Cu), nickel (Ni), cobalt (Co), manganese (Mn), silver (Ag), molybdenum (Mo), tungsten (W), vanadium (V), lanthanum (La). However, compared with precious metal elements, the use of an iron-aluminum-titanium catalyst may significantly reduce processing costs. The catalyst chamber 106 may further include a third exhaust pipe 114 configured to output the decomposed $N_2$ and $O_2$.

Referring further to FIG. 1, the device 100 of the present embodiment may also be provided with a first pump 116 to increase the pressure of the exhaust gas entering the thermal oxidation chamber 102, for example, connecting the first pump 116 to an inlet pipe 118 of the exhaust gas. A second pump 120 may also be provided at the third exhaust pipe 114, configured to provide negative pressure to the third exhaust pipe 114 to facilitate the flow of gas in the catalyst chamber 106. Moreover, to detect the effect of each equipment in real time, a sampling hole 122a may be added to the first exhaust pipe 108, a sampling hole 122b may be added to the second exhaust pipe 110, a sampling hole 122c may be added to the third exhaust pipe 114, and a sampling hole 122d may be added to the exhaust gas inlet pipe 118. The sampling hole 122a may be configured to sample and detect the concentration of gas (flammable gases and $N_2O$) to confirm whether flammable gases are oxidized and removed. The sampling hole 122b may be configured to sample and detect whether dust is filtered out. If the particle removal efficiency (PRE) of the filter fiber net is lower than 90%, the filter fiber net 112 needs to be replaced. The sampling hole 122c may be configured to sample and detect whether $N_2O$ is completely decomposed into $N_2$ and $O_2$. If the destruction and removal efficiency (DRE) of $N_2O$ is less than 90%, the catalyst needs to be replaced, and the device 100 needs to be repaired or replaced. The sampling hole 122d may be configured to sample and detect gas (flammable gases and $N_2O$) concentration in the exhaust gas as an initial value.

Figure 2:
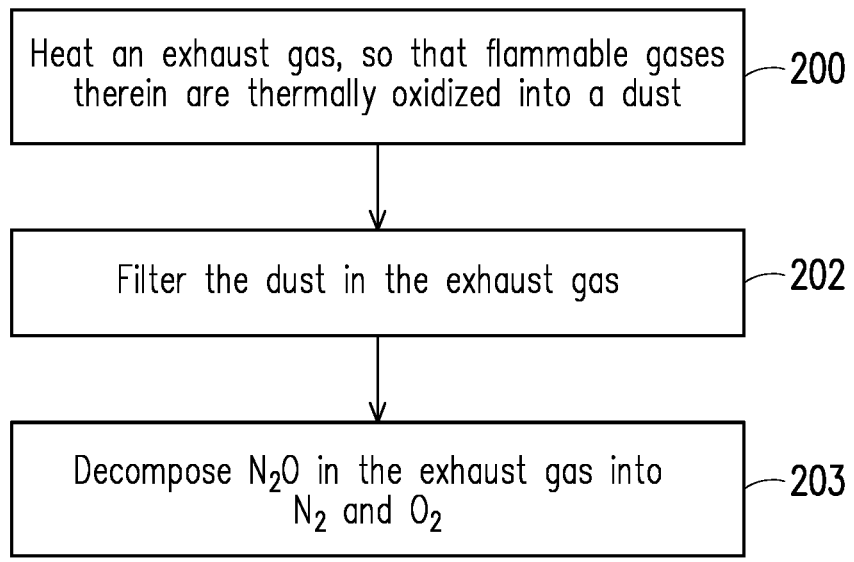
FIG. 2 is a flowchart of a device for simultaneously removing flammable gases and nitrous oxide according to another embodiment of the disclosure.

FIG. 2 is a flowchart of a device for simultaneously removing flammable gases and nitrous oxide according to another embodiment of the disclosure.

Please refer to FIG. 2. The present embodiment adopts the device 100 of the previous embodiment. First, step 200 is performed to heat the exhaust gas from a process tool, such as a semiconductor process tool using the thermal oxidation chamber above (such as 102 of FIG. 1), wherein the exhaust gas includes flammable gases and $N_2O$, and the flammable gases are thermally oxidized into dust, wherein the temperature of thermal oxidation is, for example, between 450° C. and 750° C. The flammable gases include a gas formed by at least one of silicon, phosphorus, arsenic, and boron, such as $SiH_4$, $Si_2H_6$, $PH_3$, $AsH_3$, or $B_2H_6$. Before the exhaust gas from a process tool is heated by the thermal oxidation chamber, nitrogen may also be introduced first using the first pump (such as 116 of FIG. 1) to pressurize the exhaust gas, wherein the flow rate of nitrogen may be controlled at 500 LPM or less to facilitate the reaction of $N_2O$ entering the back-end catalyst chamber (such as 106 of FIG. 1). Since the flow rate of entering the thermal oxidation chamber (such as 102 of FIG. 1) is related to pressure, the pressure of the thermal oxidation chamber (such as 102 of FIG. 1) may be controlled between 650 torr and 750 torr.

Then, step 202 is performed to filter dust from the thermal oxidation chamber (such as 102 of FIG. 1) using the high-temperature resistant dust filter (such as 104 of FIG. 1). In this step 202, temperature or flow rate does not need to be particularly controlled. The gas entering the high-temperature resistant dust filter (such as 104 of FIG. 1) may naturally enter the second exhaust pipe (such as 110 of FIG. 1) via the filter fiber net (such as 112 of FIG. 1).

Next, step 204 is performed to decompose $N_2O$ emitted from the high-temperature resistant dust filter (such as 104 of FIG. 1) into $N_2$ and $O_2$ using the above catalyst chamber (such as 106 of FIG. 1). The operating temperature of the catalyst chamber (such as 106 of FIG. 1) is, for example, between 450° C. and 600° C. Since the device of the disclosure integrates an equipment for thermally oxidizing flammable gases and an equipment for decomposing nitrous oxide, and a filter is provided between the two, the exhaust gas of the process may be continuously treated, thus achieving the effect of reducing treatment time and improving removal efficiency.

Based on the above, the device according to the disclosure may first treat flammable gases including silicon, phosphorus, arsenic, boron, etc. using a thermal oxidation chamber, and then filter out an inorganic dust generated at the process end and the thermal oxidation chamber using a high-temperature resistant dust filter, and lastly completely decompose $N_2O$ into nitrogen and oxygen via a catalyst chamber including a nitrous oxide decomposition catalyst to achieve zero pollution emission, so as to solve the shortcomings of a large amount of the harmful by-product NOx generated by the use of high-temperature thermal decomposition to treat $N_2O$ in the past, and to filter dust formed by the oxidation of other process gases.

Experiments are described below to verify the efficacy of the disclosure. However, the disclosure is not limited to the following content.

Experimental Example 1

Among the flammable gases including silicon, phosphorus, arsenic, boron, etc. used in semiconductor factories, $SiH_4$ has the largest amount. Moreover, these flammable gases may all be broken down and decomposed at a temperature of 500° C. Therefore, in Experimental Example 1, $SiH_4$ was used as the test gas.

Figure 3:
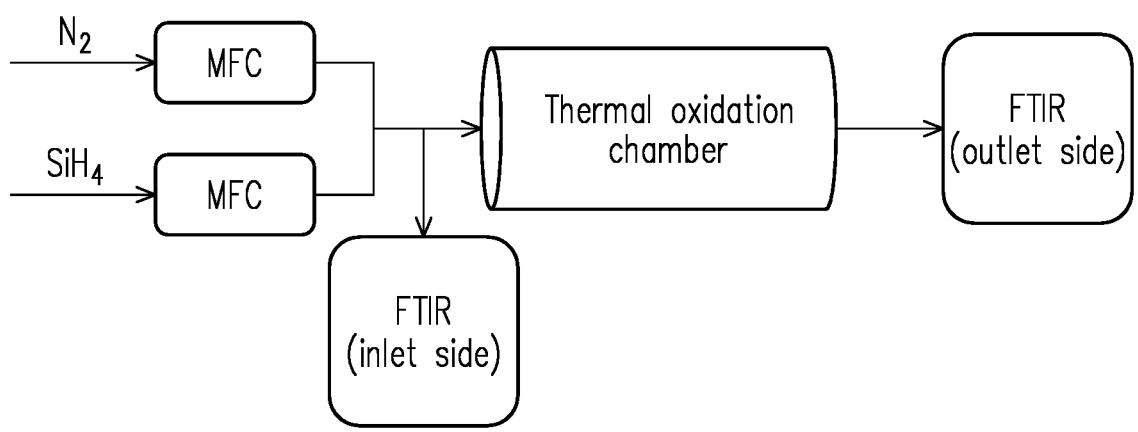
FIG. 3 is a schematic diagram of the experiment equipment of the thermal oxidation chamber of Experimental Example 1.

First, the experiment equipment as shown in FIG. 3 was provided. A cavity of the thermal oxidation chamber having a volume of about 1900 L was heated to 500° C. by electric heating or combustion, and then pure $SiH_4$ was introduced using a mass flow controller (MFC) and diluted with different flow rates of pure $N_2$ and then treated by the thermal oxidation chamber, and the $SiH_4$ concentration at the front and back ends of the thermal oxidation chamber was analyzed by Fourier transform infrared spectroscopy (FTIR) and the destruction and removal efficiency (DRE) was calculated. The experimental results are shown in Table 1 and FIG. 4 below.

TABLE 1

| Thermal oxidation chamber temperature | 500° C. | | |
|---|---|---|---|
| $N_2$ flow rate of inlet side | 52.5 LPM | 62.5 LPM | 72.5 LPM |
| DRE | 99.8% | 99.7% | 99.5% |

Figure 4:
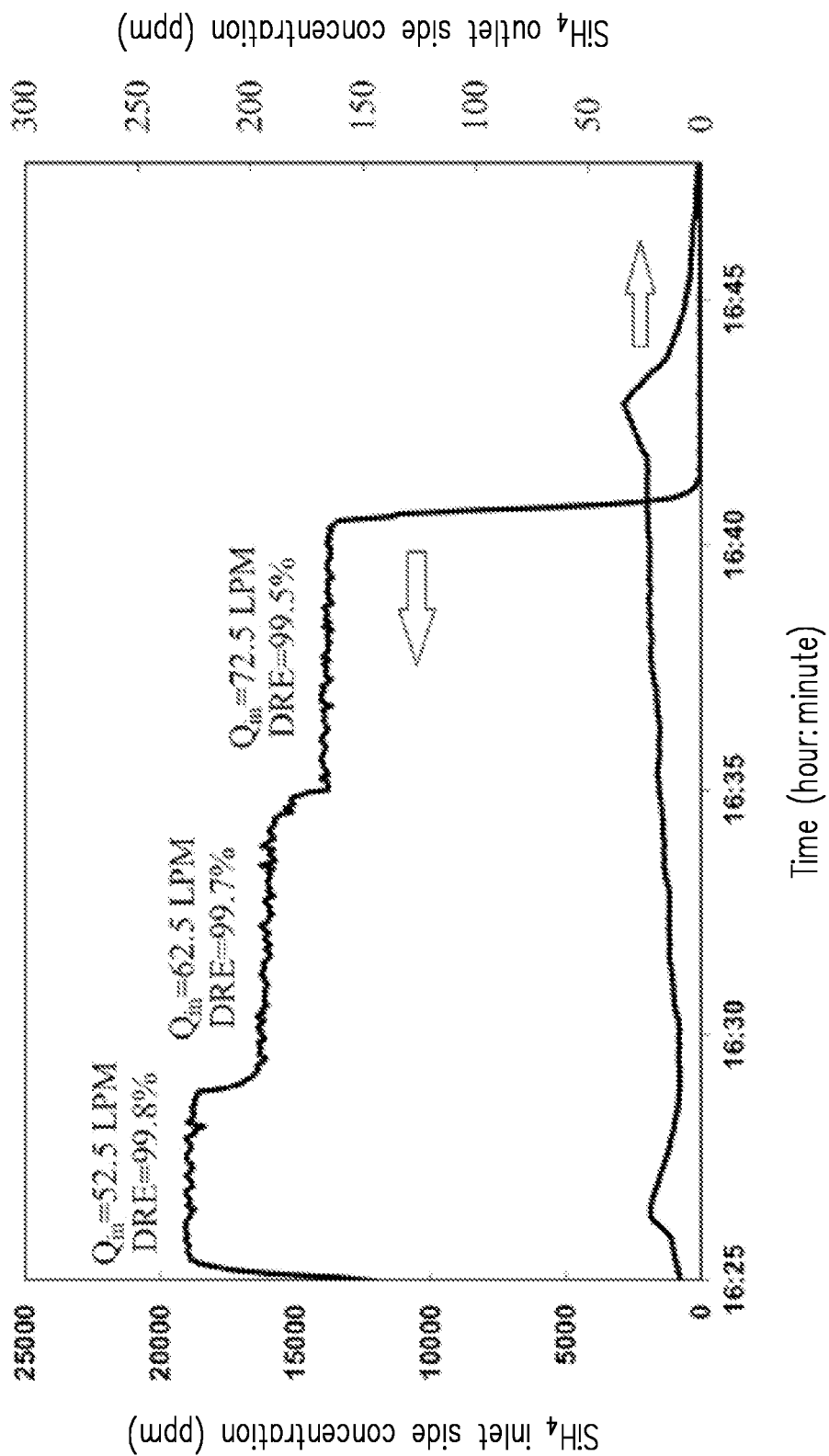
FIG. 4 is a graph showing the change of $SiH_4$ concentration with time of Experimental Example 1.

From FIG. 4 and Table 1, it may be seen that the thermal oxidation chamber of the device of the disclosure may effectively remove $SiH_4$ and oxidize $SiH_4$ into silicon dioxide ($SiO_2$). Moreover, lowering the flow rate of $N_2$ can induce more concentrated $SiH_4$ entering the thermal oxidation chamber and higher DRE.

Experimental Example 2

The peak particle size of powdered $SiO_2$ produced by thermal oxidation of $SiH_4$ was about 200 nm to 300 nm, and the higher the filtration temperature be, the better the PRE is. Therefore, in the present experiment, a filtration experiment was performed at room temperature using $SiO_2$ having a particle size of about 200 nm to test the filtration effect of the high-temperature resistant dust filter.

Figure 5:
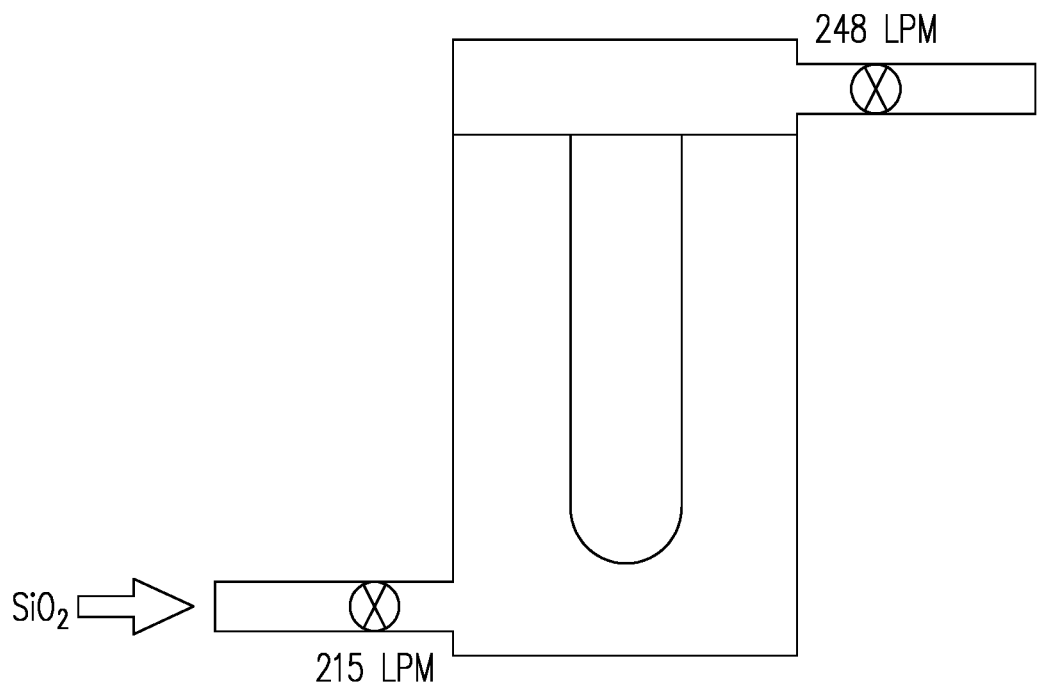
FIG. 5 is a schematic diagram of the experiment equipment of the high-temperature resistant dust filter of Experimental Example 2.

First, the experiment equipment as shown in FIG. 5 was provided, and one ceramic filter, which can process a gas flow rate of 350 LPM or less, was provided in a 45 L high-temperature resistant dust filter. Then, 200 nm $SiO_2$ powder was added at the same speed by PALAS (dust aerosol generator) into the airflow, the dust concentration at the inlet and outlet sides of the high-temperature resistant dust filter was sampled and measured, and the particle removal efficiency (PRE) thereof was calculated. The experimental results are shown in Table 2 below.

TABLE 2

| Flow rate at inlet side ($Q_{in}$) | 252 LPM | 231 LPM | 215 LPM | 54 LPM | 61 LPM |
|---|---|---|---|---|---|
| Concentration at inlet side ($C_{in}$) | 88.69 mg/m³ | 124.03 mg/m³ | 127.05 mg/m³ | 41.57 mg/m³ | 53.56 mg/m³ |
| Flow rate at outlet side ($Q_{out}$) | 323 LPM | 272 LPM | 248 LPM | 113 LPM | 135 LPM |
| Concentration at outlet side ($C_{out}$) | 3.15 mg/m³ | 0.26 mg/m³ | 2.33 mg/m³ | 0.11 mg/m³ | 0.19 mg/m³ |
| PRE | 95.45% | 99.75% | 97.88% | 99.44% | 99.21% |
| $PRE_{Avg}$ | | 97.69% | | | 99.33% |

In particular, $$PRE = 1 - \frac{Q_{out} \times C_{out}}{Q_{in} \times C_{in}}.$$

It may be obtained from Table 2 that the high-temperature resistant dust filter of the device of the disclosure has a PRE reaching 97% or above even at normal temperature. Therefore, when receiving dust from the thermal oxidation chamber, there is no need to particularly control the temperature of the high-temperature resistant dust filter to achieve the result of effective filtration.

Experimental Example 3

In order to simulate $N_2O$ exhaust gas concentration in a real process of a semiconductor factory, in the present experiment, $N_2O$ having a concentration of about 20% was decomposed by an iron-aluminum-titanium catalyst.

Figure 6:
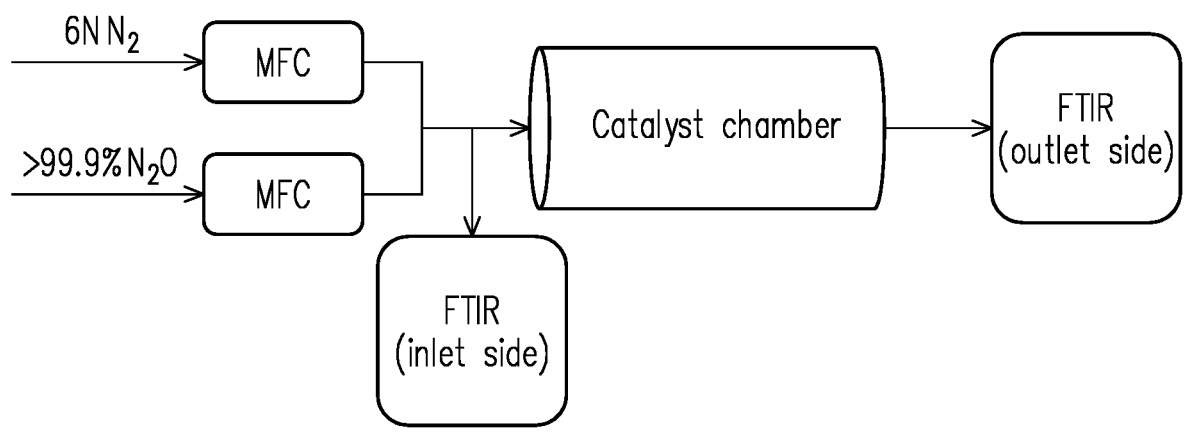
FIG. 6 is a schematic diagram of the experiment equipment of the catalyst chamber of Experimental Example 3.

First, the experiment equipment as shown in FIG. 6 was provided, and the volume of the catalyst chamber was about 20 ml, wherein an iron-aluminum-titanium catalyst particle was filled, the particle size was between 2 mm and 5 mm, and the porosity in the catalyst chamber was about 62%; and the molar ratio of sum of iron oxide and aluminum oxide to titanium dioxide in the iron-aluminum-titanium catalyst was about 3:1, and the molar ratio of iron oxide to aluminum oxide was about 2:1. Then, a test was performed according to the following conditions.
1. $N_2O$ concentration at inlet side: about 20%
2. Gas flow rate: 648.2 sccm (129.9 sccm $N_2O$, 518.3 sccm $N_2$)
3. Reaction temperature: 500° C.
4. GHSV: 1944.6 $h^{-1}$ (retention time about 1.9 seconds)
5. Linear velocity: 10.2 cm/s The $N_2O$ concentration at the outlet side of the $N_2O$ catalyst chamber was measured to be about 7837 ppm, and DRE=96.1%

$$\left(1 - \frac{7837}{200000} \times 100\% \cong 96.1\%\right)$$

was calculated. Moreover, NO and $NO_2$ were not detected.

Based on the above, the device of the disclosure includes a thermal oxidation chamber, a high-temperature resistant dust filter, and a catalyst chamber that are consecutively connected, and therefore may first treat flammable gases including silicon, phosphorus, arsenic, boron, etc. using the thermal oxidation chamber, and then filter out dust generated at the process end and the thermal oxidation chamber via the high-temperature resistant dust filter, and lastly completely decompose $N_2O$ into nitrogen and oxygen via the catalyst chamber to achieve the result of zero pollution emission and solve the issue of large amounts of the harmful by-product NOx produced by the traditional high-temperature thermal decomposition method to treat $N_2O$. At the same time, flammable gases in other processes may also be eliminated.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A device for simultaneously removing flammable gases and nitrous oxide, comprising:
   a thermal oxidation chamber receiving an exhaust gas from a process tool, the exhaust gas comprising the flammable gases and nitrous oxide, wherein the thermal oxidation chamber has a first exhaust pipe to emit a dust and nitrous oxide generated after the exhaust gas is thermally oxidized;
   a high-temperature resistant dust filter receiving the dust and nitrous oxide from the first exhaust pipe, wherein the high-temperature resistant dust filter has a filter fiber net and a second exhaust pipe, and the second exhaust pipe is configured to emit nitrous oxide; and
   a catalyst chamber receiving nitrous oxide from the second exhaust pipe, wherein the catalyst chamber has a nitrous oxide decomposition catalyst to decompose nitrous oxide into nitrogen ($N_2$) and oxygen ($O_2$).

2. The device for simultaneously removing the flammable gases and nitrous oxide of claim 1, wherein an operating temperature of the high-temperature resistant dust filter is between 20° C. and 750° C.

3. The device for simultaneously removing the flammable gases and nitrous oxide of claim 1, wherein the nitrous oxide decomposition catalyst comprises an iron-aluminum-titanium catalyst, a molar ratio range of sum of iron oxide and aluminum oxide to titanium dioxide in the iron-aluminum-titanium catalyst is from 3.5:1 to 2.5:1, and a molar ratio range of iron oxide to aluminum oxide in the iron-aluminum-titanium catalyst is from 2.5:1 to 1.5:1.

4. The device for simultaneously removing the flammable gases and nitrous oxide of claim 1, wherein a porosity in the catalyst chamber is 60% to 70%.

5. The device for simultaneously removing the flammable gases and nitrous oxide of claim 1, wherein a particle size of the nitrous oxide decomposition catalyst is between 2 mm and 5 mm.

6. The device for simultaneously removing the flammable gases and nitrous oxide of claim 1, further comprising a first pump to increase a pressure of the exhaust gas entering the thermal oxidation chamber.

7. The device for simultaneously removing the flammable gases and nitrous oxide of claim 1, wherein a position where the first exhaust pipe is connected to the high-temperature resistant dust filter is lower than an outlet position of the second exhaust pipe.

8. The device for simultaneously removing the flammable gases and nitrous oxide of claim 1, wherein the catalyst chamber comprises a third exhaust pipe configured to output nitrogen and oxygen.

9. The device for simultaneously removing the flammable gases and nitrous oxide of claim 8, further comprising a second pump to provide a negative pressure to the third exhaust pipe.

10. A method of simultaneously removing a flammable gases and nitrous oxide using the device of claim 1, comprising:
    heating the exhaust gas from a process tool by the thermal oxidation chamber, wherein the exhaust gas comprises the flammable gases and nitrous oxide, and the flammable gases is thermally oxidized into a dust;
    filtering the dust from the thermal oxidation chamber by the high-temperature resistant dust filter; and
    decomposing nitrous oxide emitted from the high-temperature resistant dust filter into nitrogen and oxygen by the catalyst chamber.

11. The method of simultaneously removing the flammable gases and nitrous oxide of claim 10, wherein a temperature of the thermal oxidation is between 450° C. and 750° C.

12. The method of simultaneously removing the flammable gases and nitrous oxide of claim 10, wherein the flammable gases comprise a gas formed by at least one of silicon, phosphorus, arsenic, and boron.

13. The method of simultaneously removing the flammable gases and nitrous oxide of claim 10, wherein the flammable gases comprise $SiH_4$, $Si_2H_6$, $PH_3$, $AsH_3$, or $B_2H_6$.

14. The method of simultaneously removing the flammable gases and nitrous oxide of claim 10, wherein a pressure of the thermal oxidation chamber is between 650 torr and 750 torr.

15. The method of simultaneously removing the flammable gases and nitrous oxide of claim 10, further comprising, before heating the exhaust gas by the thermal oxidation chamber, introducing nitrogen by a first pump to pressurize the exhaust gas.

16. The method of simultaneously removing the flammable gases and nitrous oxide of claim 15, wherein a flow rate of nitrogen is 500 LPM or less.

17. The method of simultaneously removing the flammable gases and nitrous oxide of claim 10, wherein an operating temperature of the catalyst chamber is between 450° C. and 600° C.

* * * * *